United States Patent

Pighetti et al.

Patent Number: 5,498,126
Date of Patent: Mar. 12, 1996

[54] AIRFOIL WITH DUAL SOURCE COOLING

[75] Inventors: Annette M. Pighetti, Andover; Lawrence A. Seidel, Glastonbury, both of Conn.

[73] Assignee: United Technologies Corporation, Hartford, Conn.

[21] Appl. No.: 234,488

[22] Filed: Apr. 28, 1994

[51] Int. Cl.$^6$ ............................................. F01D 9/06
[52] U.S. Cl. ................................. 415/115; 415/116
[58] Field of Search .................................. 415/115, 116

[56] References Cited

U.S. PATENT DOCUMENTS

| | | | |
|---|---|---|---|
| 5,134,844 | 8/1992 | Lee et al. | 415/116 |
| 5,252,026 | 10/1993 | Shepherd | 415/115 |
| 5,320,483 | 6/1994 | Cunha et al. | 415/115 |
| 5,403,157 | 4/1995 | Moore | 415/115 |

Primary Examiner—John T. Kwon
Attorney, Agent, or Firm—Marina F. Cunningham

[57] ABSTRACT

An airfoil for a gas turbine engine, having an airfoil portion with a leading and a trailing edge, includes dual pressure source cooling. The trailing edge of the airfoil includes an internal trailing edge passage and the leading edge includes an internal leading edge passage. Compressor bleed air at higher pressure is channeled through the leading edge passage whereas compressor bleed air at lower pressure is channeled through the trailing edge passage. The higher internal pressure in the leading edge ensures that the inward flow of products of combustion does not occur.

6 Claims, 3 Drawing Sheets

5,498,126

AIRFOIL WITH DUAL SOURCE COOLING

TECHNICAL FIELD

This invention relates to gas turbine engines and, more particularly, to the cooling of airfoils therefor.

BACKGROUND OF THE INVENTION

A gas turbine engine includes a compression section, a combustor, and a turbine. Air flows axially through the engine. As is well known in the art, the air is compressed in the compressor, where its temperature and pressure are raised. After being discharged from the compressor, the air enters the combustor, is mixed with fuel and burned therein. The hot products of combustion emerging from the combustor enter the turbine, where the hot gases expand to produce engine thrust and to drive the turbine, which in turn drives the compressor.

Both the compression and turbine sections include alternating rows or stages of rotating and stationary airfoils. Each airfoil comprises an airfoil portion having a leading edge and a trailing edge. The components of the turbine operate in an especially hostile environment that is characterized by extremely high temperatures. The temperature of hot combustion gases entering the turbine generally exceeds the melting point temperatures of the alloys from which the turbine airfoils are fabricated. Thus, to properly perform in such a harsh environment, the turbine airfoils must be cooled. The initial stages of turbine airfoils need substantially more cooling than subsequent stages thereof because the temperature and pressure of gaseous products of combustion are highest at the turbine entrance, and decrease progressively therefrom. Moreover, each airfoil requires more cooling at the leading edge than at the trailing edge because the temperature and pressure of the products of combustion are higher at the leading edge of the airfoil than at the trailing edge thereof.

Generally, turbine airfoil cooling is accomplished by internal impingement cooling, internal convection cooling, or some combination thereof. In convection cooling, cooling air flows through a typically serpentine passage within the airfoil, continuously removing heat therefrom. With impingement cooling, cooling air is channeled to the inside of the airfoil and directed against the inside walls of the airfoil. The air then exits the airfoil through a set of film holes provided within the airfoil walls. Although both convection cooling and air impingement cooling are effective methods for cooling blades, the impingement cooling has a higher pressure drop associated therewith.

Frequently, multiple cooling passages supplied from a single source of cooling air are used in a single airfoil. A second stage turbine stationary airfoil (vane), comprising an airfoil portion flanged by an inner diameter platform and an outer diameter platform, is convectionally cooled with a multi-pass serpentine type passage within the trailing edge and a single-pass passage within the leading edge. The air from the serpentine passage is discharged through a plurality of slots disposed near the trailing edge, whereas the air from the leading edge passage is discharged through an outlet disposed in the inner platform and is subsequently utilized to cool an inner seal which is disposed radially inward of the inner platform of the second stage stationary airfoil. The air discharged from the leading edge passage is still cool relative to the temperature of the inner seal and provides adequate cooling thereto.

The cooling air is bled from the engine's compressor and bypasses the combustor. It will be understood that any compressor bleed air diverted from the compressor for such cooling will be unavailable to support combustion in the combustor and therefore will reduce engine power. Thus, to minimize any sacrifice in engine performance due to reduced airflow to support combustion, any scheme for cooling turbine airfoils must optimize the use of compressor bleed cooling air. Furthermore, it is desirable to bleed compressor air for cooling from the initial stages of the compressor rather than from the final stages thereof for two reasons. First, at the initial stages of the compressor, less work has been invested in compressing air than at the final stages of the compressor and thus, engine power losses due to cooling requirements are lesser. Secondly, compressor air at initial stages has a lower temperature than at the later stages, which is desirable for cooling. However, air from the initial stages of the compressor may not have sufficient pressure to provide adequate cooling for the turbine airfoils. Thus, there is a trade-off between either bleeding lower temperature, lower pressure compressor air from initial stages without having invested too much work into compressing the air, but not getting sufficient pressure for cooling; or bleeding higher temperature, higher pressure compressor air from final stages with reduced engine performance.

It has been determined that the above mentioned cooling scheme for the second stage turbine vane must be improved upon for modern, higher thrust engines. Modern compressors include additional stages of airfoils resulting in higher temperatures and pressures of the products of combustion entering the turbine. The turbine airfoils, in general, need more cooling than prior art airfoils to avoid burning of the walls thereof. In particular, the leading edge of the airfoils needs more cooling than the trailing edge thereof because the external pressure and temperatures are higher at the leading edge. Impingement cooling would provide a better cooling for the leading edge than convection cooling. The drawback to impingement cooling of the leading edge is that the pressure drop of the cooling air in the passage is higher than when convection cooling is used. A high pressure drop results in lower internal pressure in the leading edge than in the trailing edge. Additionally, the external pressure at the leading edge is higher than the external pressure at the trailing edge. If the pressure of the airfoil internal air is lower than the pressure of external air (products of combustion), the hot external air will enter the internal passage and burn the walls of the airfoil. Thus, to avoid inward flow of external air, the leading edge requires higher internal pressure than the trailing edge.

Although cooling by higher pressure compressor air is necessary for the airfoil to avoid burning as set forth hereinabove, there are two major drawbacks to the use of higher pressure compressor air. Use of higher pressure compressor air exclusively would be undesirable because it directly diverts air from the combustion process, thereby reducing the overall performance of the engine. Secondly, the compressor bleed air with higher pressure also has higher temperature. The temperature of the higher pressure compressor air would be too high to provide adequate cooling for the inner seal. Thus, there is an acute need to provide sufficient cooling to modem turbine airfoils without incurring a penalty in engine performance.

DISCLOSURE OF THE INVENTION

According to the present invention, an airfoil for a gas turbine engine includes dual pressure source cooling, that efficiently cools the airfoils by channeling compressor bleed air at higher pressure through the leading edge passage of the airfoil and channeling compressor bleed air at lower pressure through the trailing edge passage of the airfoil. The higher pressure in the leading edge passage ensures that the inward flow of products of combustion into the internal passage of the airfoil does not occur, even if the leading edge passage is cooled by impingement cooling that has a high pressure drop associated therewith. Furthermore, the leading edge of the airfoil is adequately cooled by the impingement cooling without incurring a greater than necessary penalty in engine performance, which would otherwise occur, by bleeding the compressor air from higher stages of the compressor for trailing edge cooling as well.

The airfoil comprises a leading edge internal passage having a first inlet in communication with a first plenum and a trailing edge internal passage having a second inlet in communication with a second plenum. The first plenum receives compressor bleed air at a higher pressure than the pressure of compressor bleed air which fills the second plenum. Thus, the two internal passages within the airfoil are cooled by compressor bleed air that is bled from different stages of the compressor and, consequently, have different pressures.

The trailing edge internal passage includes an outlet formed within an inner diameter platform of the airfoil for a portion of the cooling air to discharge therefrom to cool an inner seal, disposed radially inward of the inner platform of the second stage stationary airfoil. Thus, with the cooling scheme of the present invention, the inner seal is cooled by the lower stage compressor air discharged from the trailing edge passage, since higher stage compressor bleed air has a higher temperature which would be too high for purposes of cooling the inner seal.

The foregoing and other advantages of the present invention become more apparent in light of the following detailed description of the exemplary embodiments thereof, as illustrated in the accompanying drawings.

BEST MODE FOR CARRYING OUT THE INVENTION

Figure 1:
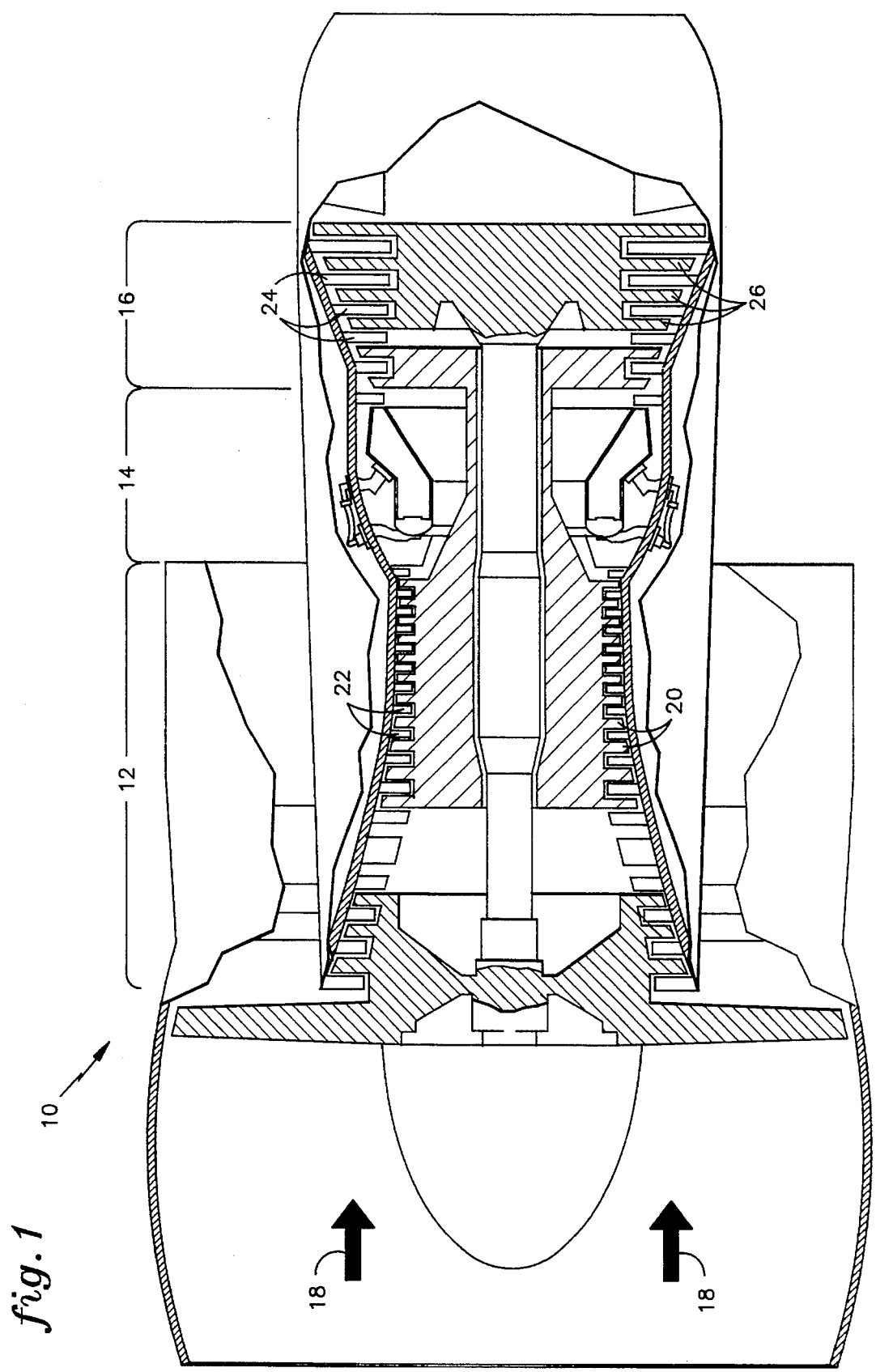
FIG. 1 is a schematic, sectional elevation of a gas turbine engine.

Referring to FIG. 1, a gas turbine engine 10 includes a compressor 12, a combustor 14 and a turbine 16. Air 18 flows axially through the sections 12–16 of the engine 10. As is well known in the art, air 18 is compressed in the compressor 12 with its temperature and pressure rising as the air flows through a plurality of alternating rows or stages of rotating and stationary airfoils 20, 22, respectively. The compressor air is mixed with fuel and burned in the combustor 14. The products of combustion exiting the combustor are at their highest temperature and pressure as they enter the turbine 16 which comprises alternating stages of stationary and rotating airfoils 24, 26, respectively. As the air is expanded in the turbine 16, the temperature and pressure of the products of combustion gradually decrease. The hot gases produce thrust for propulsion and drive the turbine 16 which in turn drives the compressor 12.

Figure 2:
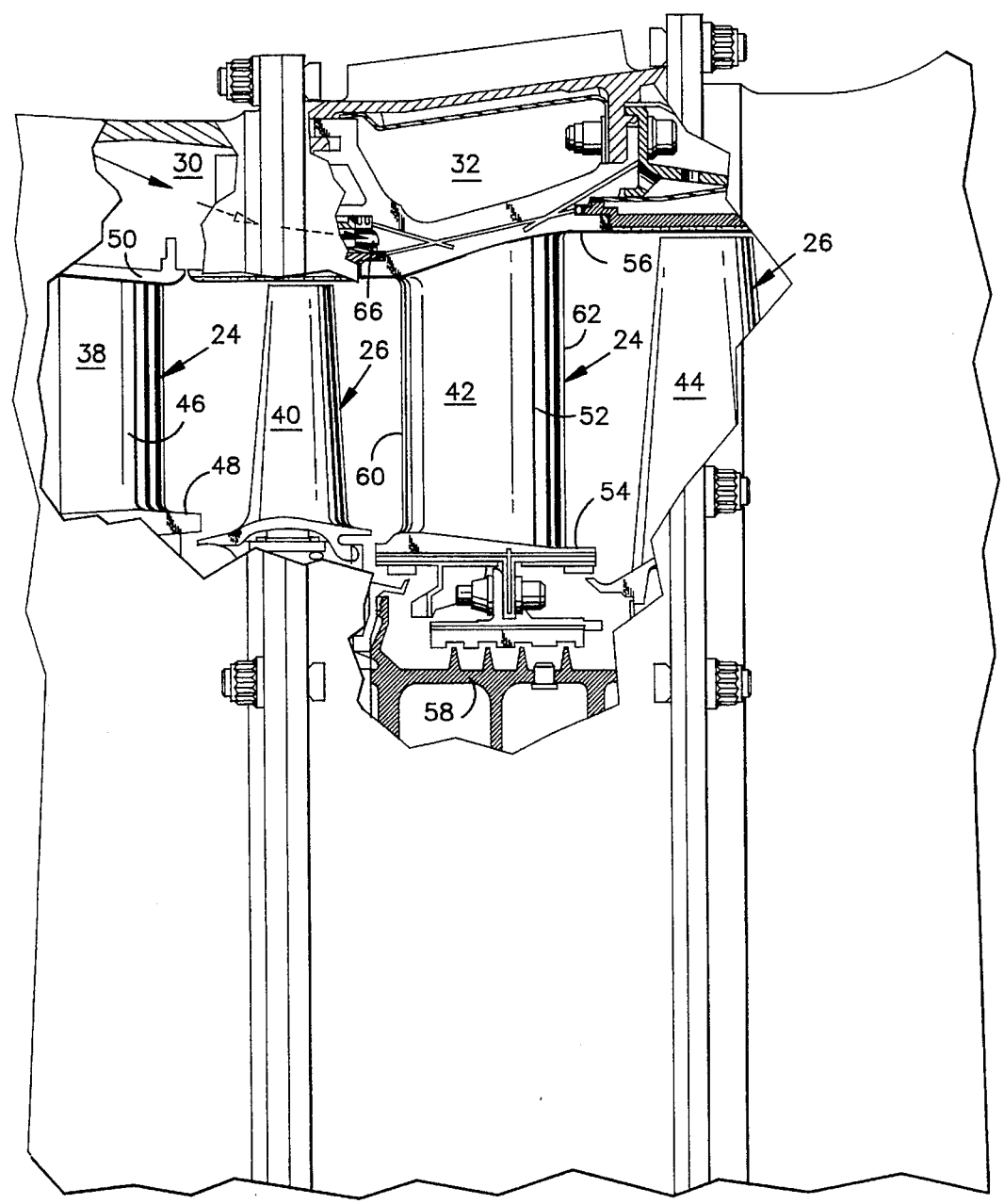
FIG. 2 is an enlarged sectional elevation of a portion of a turbine of the gas turbine engine of FIG. 1 with an airfoil according to the present invention.

Referring to FIG. 2, a first plenum 30, is pressurized with a source of relatively constant, higher pressure air bled from a higher stage of the compression section 12, bypassing combustor 14. A second plenum 32 receives a source of relatively constant lower pressure air pressure bled from a lower stage of compression section 12, upstream from the higher stage of compressor air bled to the first plenum 30.

The first row of airfoils at the turbine entrance comprises a plurality of first stage vanes 38 followed by a row of first stage rotable blades 40 succeeded by a row of second stage vanes 42 and second stage blades 44, respectively, and so on. The first stage vane 38 includes an airfoil portion 46 flanged by a first vane inner diameter platform 48 and by a first vane outer diameter platform 50 that defines, in part, the first plenum 30. The second stage vane 42 includes an airfoil portion 52 flanged by a second vane inner diameter platform 54 and by a second vane outer diameter platform 56 defining, in part, the second plenum 32. An inner seal 58 is disposed radially inward of the inner platform 54 of the second stage vane 42.

Figure 3:
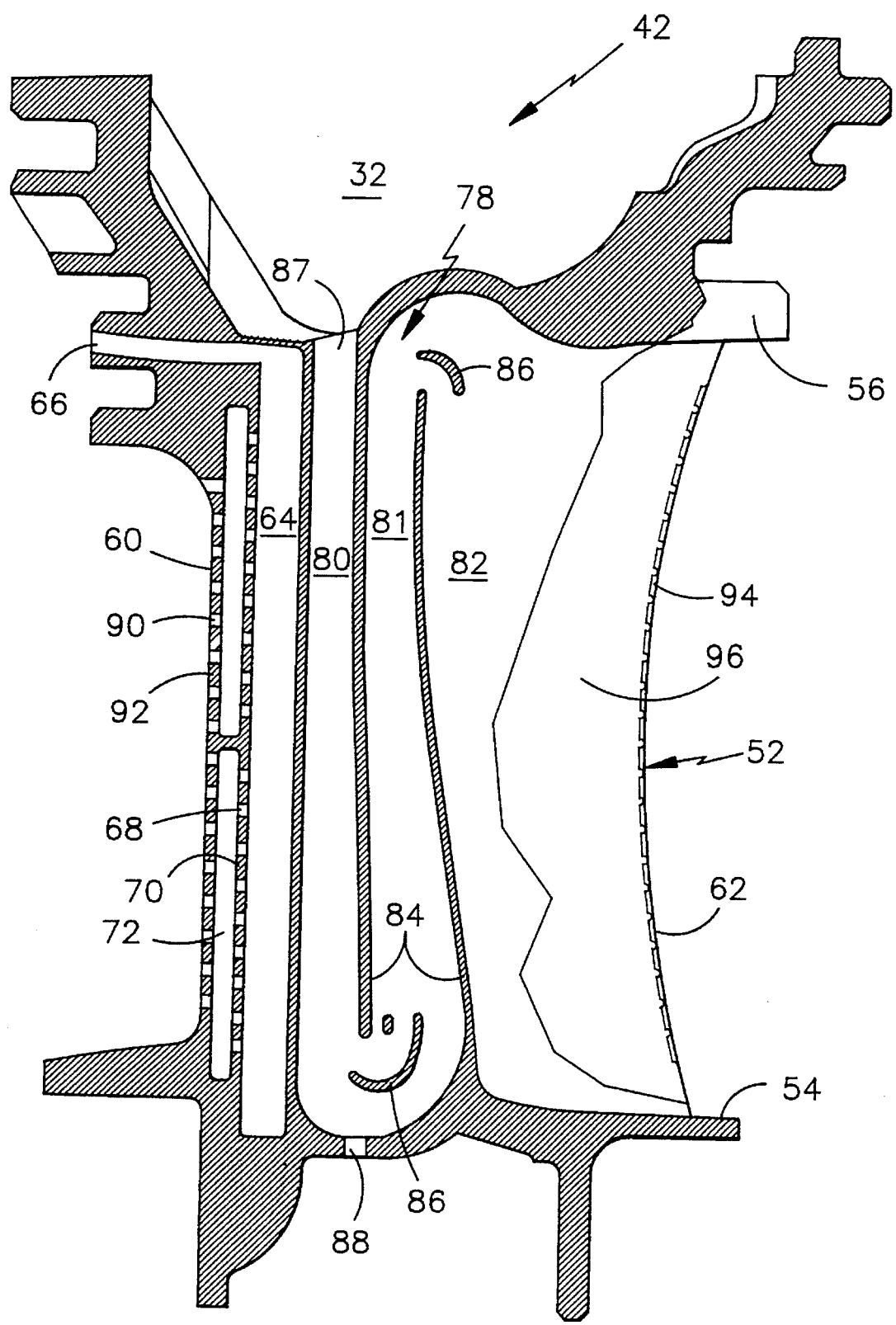
FIG. 3 is an enlarged, partially sectional elevation of the airfoil of FIG. 2.

Referring to FIG. 3, the second stage vane 42 includes a leading edge 60 and a trailing edge 62. A leading edge impingement cooling passage 64 is formed within the leading edge 60 of the airfoil 42. The leading edge passage 64 includes a first inlet 66, formed within the outer diameter platform 56 and communicating with the first plenum 30, and a plurality of cast cross over holes 68 formed within a leading edge passage wall 70 separating the leading edge passage 64 from a leading edge exhaust passage 72.

A serpentine shaped cooling passage 78, formed within the airfoil portion 52, winds back and forth within the airfoil portion 52 and comprises parallel sections 80–82 extending in a spanwise direction, sections 80–82 being defined, in part, by passage walls 84 and turning vanes 86 which facilitate movement of the airflow through the passage. The serpentine passage 78 includes a second inlet 87 formed within the outer diameter platform 56 and communicating with the second plenum 32 and an outlet 88 formed within the inner diameter platform 54 and discharging a portion of cooling air flowing through the section 80 of the serpentine passage 78. A plurality of leading edge film holes 90 is disposed within a leading edge airfoil wall 92 and a plurality of trailing edge slots 94 is disposed within a trailing edge wall 96.

In operation, the higher stage compressor air, bypassing combustor 14, is channeled into the first plenum 30 through a suitable passage (not shown) within the engine and flows into the leading edge passage 64 through the first inlet 66. The pressure of the higher stage compressor air in the first plenum 30 is higher than ambient pressure at the second stage turbine. As cooling air enters the leading edge passage 64 through the first inlet 66 due to the pressure difference between the interior and exterior of the airfoil 42, the air is directed onto the interior of the leading edge wall 92 through the cast cross over holes 68, thereby cooling that portion of the leading edge wall 92. The air exits exhaust passage 72 through the film holes 90 in the leading edge wall 92.

The lower stage compressor air, bypassing the combustor 14, is channeled into the second plenum 32 through suitable passages (not shown) within the engine and flows into serpentine passage 78 through the second inlet 87. The cooling air follows the serpentine passage 78 through sections 80–82, being guided by the passage walls 84 and turning vanes 86. The cooling air reduces the temperature of the airfoil walls and exits the serpentine passage 78 through the plurality of slots 94 in the trailing edge 62 of the airfoil 42. The cooling air also exits the serpentine passage 78 through the outlet 88, thereby furnishing a supply of cool air to the inner seal 58, as shown in FIG. 2.

The leading edge passage 64, providing impingement cooling to the leading edge 60 of the airfoil 42, has a high pressure drop associated therewith as the air travels therethrough. Also, external pressure at the leading edge of the airfoil 42 is higher than the external pressure at the trailing edge. If the internal pressure in the leading edge passage 64 becomes lower than the external airfoil pressure, an inward flow of hot external air would occur due to that pressure difference. For a modern Pratt & Whitney aircraft engine manufactured and sold by the Pratt & Whitney division of United Technologies Corporation, the assignee of this invention, the fifteenth stage compressor air, channeled through the leading edge passage 64, provides sufficiently high pressure to avoid an inward flow of hot external air into the leading edge passage 64.

The air from the serpentine passage 78 is discharged through the slots 94 at the trailing edge of the airfoil. Since the external pressure at the trailing edge is lower than the external pressure at the leading edge, the internal pressure within the serpentine passage can be lower than the internal pressure in the leading edge passage and still avoid an inward flow of external air. Therefore, air which has not been compressed as much can be used to cool the trailing edge and thus not rob the engine of more than required power. Also, the inner seal 58 requires cooling by compressor air at lower temperature than the temperature of the fifteenth stage compressor air. With the above mentioned Pratt & Whitney engine, the twelfth stage compressor air that is bled into the second plenum 32 is at a lower pressure and temperature than the fifteenth stage compressor air, and provides adequate cooling for the serpentine passage 78 and the inner seal 58. Dual source cooling provides efficient cooling for the airfoil 42 without diverting unnecessary amounts of fifteenth stage compressor air from the combustion process.

While the present invention has been illustrated and described with respect to a particular embodiment thereof, it should be appreciated by those of ordinary skill in the art, that various modifications to this invention may be made without departing from the spirit and scope of the present invention. For example, the cooling scheme having two pressure sources of cooling air channeled through one airfoil may be incorporated not only in the second stage vane, but also in any airfoil, including rotating blades. Furthermore, although this particular embodiment employs fifteenth and twelfth stage compressor bleed air for cooling of the airfoil, any compressor bleed air can be utilized regardless of which stage it is bled from, as long as the pressures in the first plenum is higher than that of the second plenum.

We claim:

1. An airfoil for gas turbine engines having an airfoil-shaped portion flanged by an inner diameter platform and an outer diameter platform, said airfoil-shaped portion having a leading edge and a trailing edge, said airfoil having a leading edge internal cooling passage and a trailing edge internal cooling passage, said airfoil characterized by:

a first inlet for providing cooling air to said leading edge cooling passage, said first inlet being in communication with a first plenum;

a second inlet for providing cooling air to said trailing edge cooling passage, said second inlet being in communication with a second plenum independent from said first plenum;

said first plenum being adopted for communication with compressor discharge air at a first, higher pressure; and said second plenum being adopted for communication with compressor discharge air at a second, lower pressure.

2. The airfoil according to claim 1 characterized by said trailing edge internal cooling passage having an outlet formed within said inner diameter platform of said airfoil to discharge a portion of said lower pressure cooling air therethrough to cool an inner seal disposed radially inward from said inner diameter platform of said airfoil.

3. The airfoil according to claim 1 characterized by said first inlet being disposed within said outer diameter platform of said airfoil.

4. The airfoil according to claim 1 characterized by said second inlet being disposed within said outer diameter platform of said airfoil.

5. The airfoil according to claim 1 characterized by said first plenum being pressurizable with fifteenth stage engine compressor air.

6. The airfoil according to claim 1 characterized by said second plenum being pressurizable with twelfth stage engine compressor air.

\* \* \* \* \*